(12) United States Patent
Guan et al.

(10) Patent No.: US 10,659,588 B1
(45) Date of Patent: May 19, 2020

(54) METHODS AND SYSTEMS FOR AUTOMATIC DISCOVERY OF FRAUDULENT CALLS USING SPEAKER RECOGNITION

(71) Applicant: Capital One Services, LLC, McLean, VA (US)

(72) Inventors: Zhiyuan Guan, McLean, VA (US); Carl S. Ashby, Montpelier, VA (US); Isabelle Alice Yvonne Moulinier, Richfield, MN (US); Mark E. Dickison, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/360,783

(22) Filed: Mar. 21, 2019

(51) Int. Cl.
*H04M 1/67* (2006.01)
*H04M 3/38* (2006.01)
*G10L 17/00* (2013.01)

(52) U.S. Cl.
CPC ............. *H04M 1/67* (2013.01); *G10L 17/005* (2013.01); *H04M 3/385* (2013.01); *H04M 2201/41* (2013.01)

(58) Field of Classification Search
CPC ....... G10L 17/00; G10L 17/14; G10L 17/005; H04M 2203/6027; H04M 2203/6045; H04M 3/2281; H04M 3/42059; H04M 15/47; H04M 2201/40; H04M 2201/405; H04M 2201/41; H04M 3/4936;
(Continued)

(56) References Cited

U.S. PATENT DOCUMENTS

| 5,623,539 | A | | 4/1997 | Bassenyemukasa et al. |
| 6,078,807 | A | * | 6/2000 | Dunn ...................... H04M 3/38 |
| | | | | 455/410 |

(Continued)

FOREIGN PATENT DOCUMENTS

EP          2437477 A1 *  4/2012  ............. G10L 17/04

*Primary Examiner* — Akelaw Teshale
(74) *Attorney, Agent, or Firm* — Bookoff McAndrews, PLLC

(57) ABSTRACT

A computer-implemented method for determining potentially undesirable voices, according to some embodiments, includes: receiving a plurality of audio recordings, the plurality of audio recordings comprising voices associated with undesirable activity, and determining a plurality of audio components of each of the plurality of audio recordings. The method may further comprise generating a multi-dimensional vector of audio components, from the plurality of audio components, for each of the plurality of audio recordings to generate a plurality of multi-dimensional vectors of audio components, and comparing audio components between the plurality of multi-dimensional vectors of audio components to determine a plurality of clusters of multi-dimensional vectors, each cluster of the plurality of clusters comprising two or more of the plurality of multi-dimensional vectors of audio components, wherein each cluster of the plurality of clusters corresponds to a blacklisted voice. The method may further comprise receiving an audio recording or audio stream, and determining whether the audio recording or audio stream is associated with a voice associated with undesirable activity based on a comparison to the plurality of clusters.

19 Claims, 5 Drawing Sheets

(58) Field of Classification Search
CPC ....... H04M 7/0078; H04M 2215/0148; H04M 3/385; H04M 1/271; H04M 2203/40; H04M 3/2218; H04M 3/382; H04M 1/67
See application file for complete search history.

(56) References Cited

U.S. PATENT DOCUMENTS

| | | | |
|---|---|---|---|
| 7,299,177 B2 | 11/2007 | Broman et al. | |
| 8,423,349 B1* | 4/2013 | Huynh | G06F 40/56 |
| | | | 704/9 |
| 8,812,318 B2* | 8/2014 | Broman | G06Q 20/341 |
| | | | 704/246 |
| 8,924,285 B2* | 12/2014 | Rajakumar | G06F 21/32 |
| | | | 705/38 |
| 9,716,791 B1* | 7/2017 | Moran | H04L 63/12 |
| 9,824,692 B1* | 11/2017 | Khoury | G10L 17/02 |
| 2002/0010587 A1* | 1/2002 | Pertrushin | G10L 17/26 |
| | | | 704/275 |
| 2018/0082689 A1* | 3/2018 | Khoury | G10L 17/04 |
| 2018/0190296 A1* | 7/2018 | Williams | H04M 3/4936 |

* cited by examiner

METHODS AND SYSTEMS FOR AUTOMATIC DISCOVERY OF FRAUDULENT CALLS USING SPEAKER RECOGNITION

TECHNICAL FIELD

Various embodiments of the present disclosure relate generally to analysis of voice calls to determine potentially fraudulent or other undesirable activity, and relate particularly to methods and systems for clustering voice calls.

BACKGROUND

Fraudulent and other undesirable uses of telephonic communications have resulted in billions of dollars in losses to companies and individual victims. Fraudulent or harassing callers may call their victims directly, or may call banks, credit card, and other companies to attempt to gain access to the accounts of others.

Telephone and other companies may attempt to limit fraud by banning or blacklisting calls from certain voices. One approach might first identify a set of fraudulent voices and compare each incoming call against that set. However, the initial creation of such a blacklist may rely heavily on external tagging and/or manual review, which may be inaccurate, limited in coverage, expensive, and slow. Further, these methods might not provide linkage between calls. That is, it may be unclear whether a set of identified fraudulent calls are from the same voice. Such information may enable the creation of blacklists based on voices rather than identified fraudulent calls, as well as facilitating law enforcement efforts. In addition, human review of calls can be expensive, unreliable, and not easily scalable.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure methods, systems, and non-transitory computer-readable media are disclosed for adapting application programming interfaces (APIs). Each of the examples disclosed herein may include one or more of the features described in connection with any of the other disclosed examples.

In one example, a computer-implemented method for determining potentially undesirable voices, according to some embodiments, includes: receiving a plurality of audio recordings, the plurality of audio recordings comprising voices associated with undesirable activity, and determining a plurality of audio components of each of the plurality of audio recordings. The method may further comprise generating a multi-dimensional vector of audio components, from the plurality of audio components, for each of the plurality of audio recordings to generate a plurality of multi-dimensional vectors of audio components, and comparing audio components between the plurality of multi-dimensional vectors of audio components to determine a plurality of clusters of multi-dimensional vectors, each cluster of the plurality of clusters comprising two or more of the plurality of multi-dimensional vectors of audio components, wherein each cluster of the plurality of clusters corresponds to a blacklisted voice. The method may further comprise receiving an audio recording or audio stream, and determining whether the audio recording or audio stream is associated with a voice associated with undesirable activity based on a comparison to the plurality of clusters.

In another example, a computer-implemented method for determining potentially undesirable voices, may include receiving an audio recording, the audio recording being associated with a voice associated with undesirable activity, and determining a plurality of audio components of the audio recording. The method may further include generating a multi-dimensional vector of audio components of the audio recording, and determining whether the multi-dimensional vector of audio components matches with one of a plurality of clusters of multi-dimensional vectors, the plurality of clusters of multi-dimensional vectors being associated with a plurality of audio recordings, the plurality of audio recordings comprising voices associated with undesirable activity, the plurality of clusters of multi-dimensional vectors being automatically generated based on a plurality of audio recordings without human intervention, and in response to determining that the multi-dimensional vector of audio components matches one of the plurality of clusters of the multi-dimensional vectors, flagging the audio recording as potentially undesirable.

In another example, a computer system for determining potentially undesirable voices, may include a memory storing instructions, and one or more processors configured to execute the instructions to perform operations including receiving a plurality of audio recordings, the plurality of audio recordings comprising voices associated with undesirable activity, and determining a plurality of audio components of each of the plurality of audio recordings. The operations may further include generating a multi-dimensional vector of audio components, from the plurality of audio components, for each of the plurality of audio recordings to generate a plurality of multi-dimensional vectors of audio components, and comparing audio components between the plurality of multi-dimensional vectors of audio components to determine a plurality of clusters of multi-dimensional vectors, each cluster of the plurality of clusters comprising two or more of the plurality of multi-dimensional vectors of audio components, wherein each cluster of the plurality of clusters corresponds to a blacklisted voice. The operation may further include receiving an audio recording or audio stream, and determining whether the audio recording or audio stream is associated with a voice associated with undesirable activity based on a comparison to the plurality of clusters.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," and "generally," are used to indicate a possible variation of ±10% of a stated or understood value.

In general, the present disclosure provides methods and systems for determining potentially fraudulent or undesirable voices. As will be discussed below in more detail, in methods and systems according to the present disclosure, existing techniques may be improved so as to detect and take steps to restrict fraud and other undesirable activity.

Figure 1:
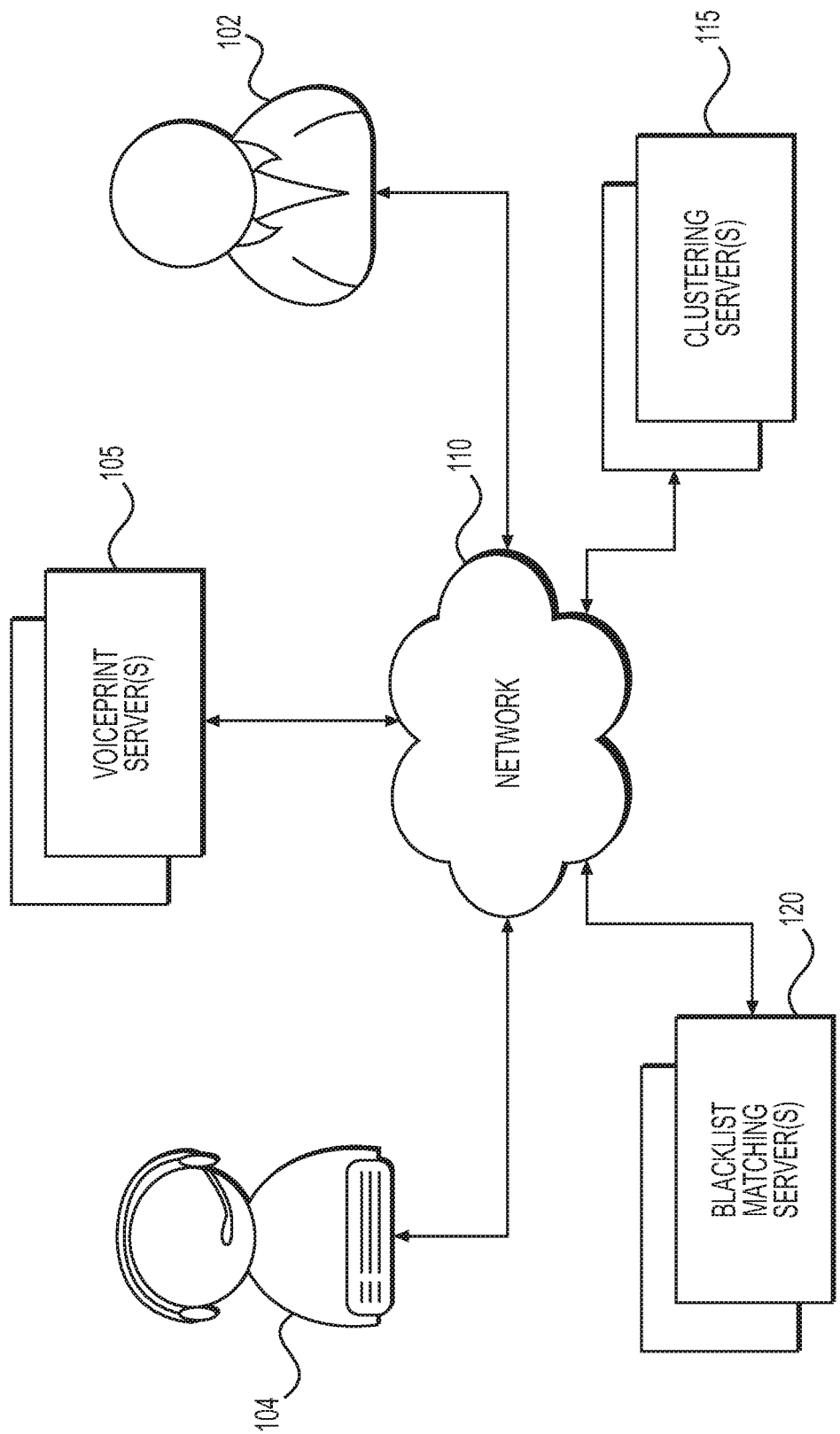
FIG. 1 depicts a client-server environment, according to one or more embodiments.

FIG. 1 depicts a client-server environment, according to one or more embodiments. Callers/users 102 may place voice and/or video calls across network 110, which may comprise a telephonic network, for example a public switched telephone network (PSTN), and/or electronic network, for example, an Transmission Control Protocol/Internet Protocol (TCP/IP) network, voice over IP (voIP) network, etc. Types of networks 110 may include one or more Local Area Networks (LANs), Wide Area Networks (WANs), Wireless Local Area Networks (WLANs), etc. The receiver of the call (callee) may be, for example, other users of the network 110, and/or operators 104 associated with a company, organization, or service, etc. The operators 104 may be human or automated, and companies, organizations, or services may utilize a combination of human and automated operators.

As will be discussed further in embodiments presented herein, callers 102 may place a call across the network 110 to a callee. One or more voiceprint servers 105 may generate one or more voiceprints of the call, either while the call is ongoing, or sometime after the call is completed. A voiceprint may be a digital representation of a recording of a voice. One or more clustering servers 115 may cluster audio of the call with other calls, where the clustering may be performed based on similarities of one or more aspects of the caller's voice. One or more blacklist matching servers 120 may maintain a list and/or data store of blacklisted voices and/or clusters of voices, and/or metadata associated therewith. The blacklisted voices may be known or suspected to engage in fraudulent or other legally or policy prohibited activity, harassment, or other undesirable activity. While the voiceprint servers 105, clustering servers 115, and blacklist matching servers 120 are discussed as separate entities herein, techniques disclosed herein may be practiced on any number of computers or servers. The functionality of these servers may be practiced on only one computer, for example. Techniques discussed herein allow for the automatic clustering of calls to generate a blacklist of one or more voices without requiring manual tagging of voice recordings, or other manual activities by humans. However, while techniques disclosed herein are discussed as being automated processes implemented in software, some portion of techniques discussed herein may be implemented by humans manually. For example, while the creation of voiceprints on the voiceprint servers 105, and voiceprint clustering on clustering servers 115 may be automated, cluster review, blacklist review and maintenance, for example, may be performed manually by humans.

Figure 2:
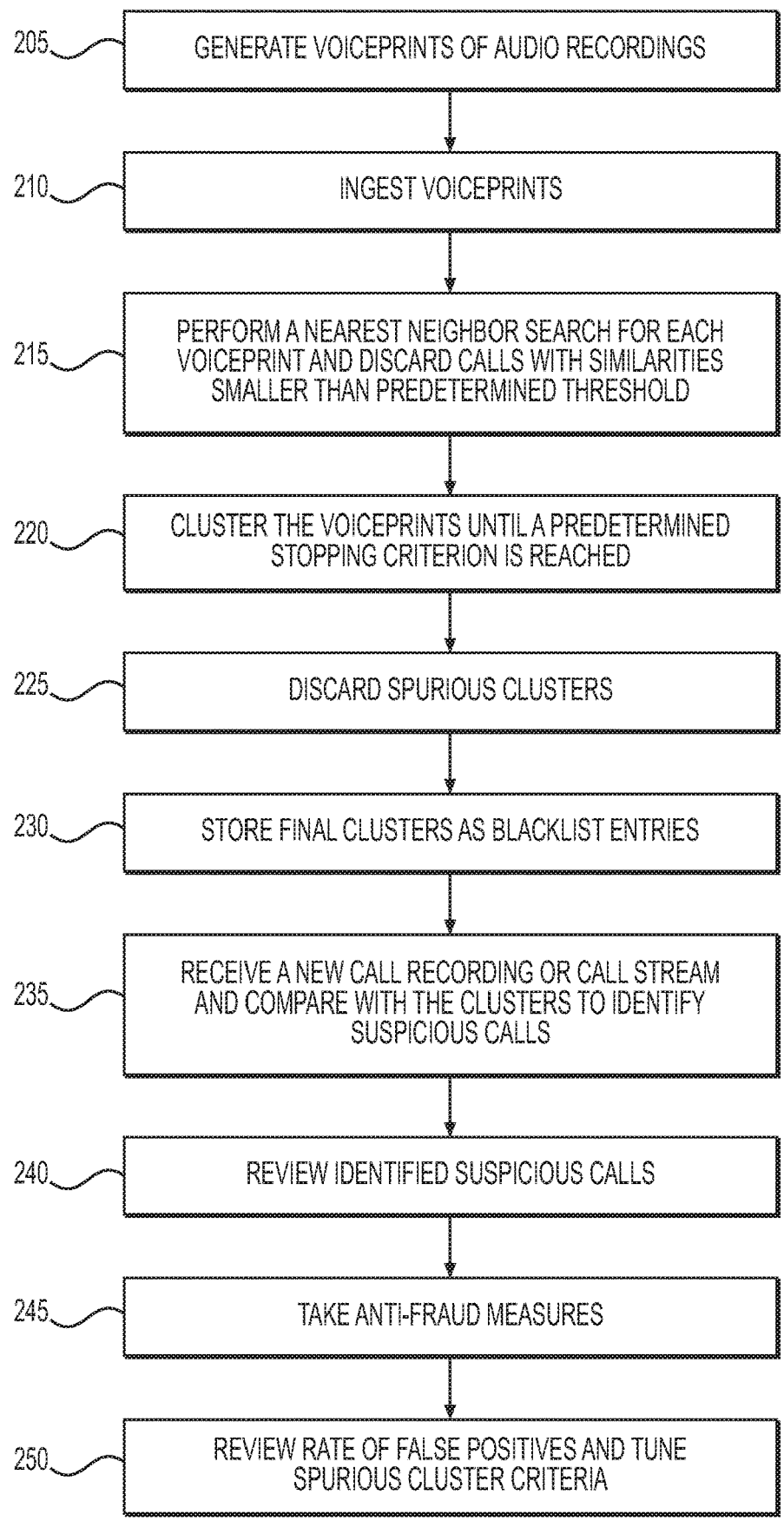
FIG. 2 illustrates a process for clustering and determining potentially fraudulent or otherwise undesirable voices, according to one or more embodiments.

FIG. 2 illustrates a process for determining potentially fraudulent or undesirable voices, according to one or more embodiments, and may be performed in the example environment of FIG. 1.

At step 205, one or more voiceprints may be generated of one or more audio recordings or audio streams from calls received from callers 102. One or more voiceprint servers 105 may consume a pool of call recordings and generate one or more voiceprints of each call. The pool of recordings may contain both legitimate calls and fraudulent ones (which we attempt to discover and link between). Only a small percentage of the pool of recordings might be fraudulent. The voiceprint may correspond to a fixed dimensional vector. For example, each vector may comprise 150 dimensions representing 150 aspects of the audio. The contents of the vectors may be certain attributes of the caller voice like pitch, rhythm, timbre, coarseness, etc. The contents of the vectors might not themselves be directly human interpretable. The number of dimensions and contents of the vectors may be consistent per specification for taking a voiceprint from an audio stream, and thus may be applied uniformly across all analyzed voice calls. The number of dimensions in the schema may vary, but might be kept consistent across any voiceprints that are compared or clustered. The vectors may then be written to a database or other data store.

At step 210, clustering servers 115 may receive and ingest the one or more voiceprints, which may be received from the database or other data store. The clustering servers 115 also may receive metadata associated with the voiceprints, which may be used to more effectively cluster the voiceprints, as will be discussed further below.

The clustering servers 115 may cluster hundreds of thousands, if not millions, of call voiceprints. However, the computation required to process the voiceprints may scale polynomially with the number of calls that are clustered. As a result, even scaling a few thousand voiceprints may be unacceptably computationally demanding, let alone scaling millions of voiceprints, as may be necessary in a large-scale system. Optionally, at step 215, ingested voiceprints at clustering servers 115 may be put through a nearest neighbor (NN) search to eliminate voiceprints that are unlikely to cluster. The NN search may be performed automatically, for example, if it is determined that the voiceprint dataset is too large to be processed efficiently in the subsequent steps. Predetermined thresholds for number of voiceprints and/or expected cluster time may trigger the NN search. The NN search can be exact (for example, by using an all nearest neighbors algorithm) or approximate (for example, by using a hierarchical navigable small world algorithm). The calls may be ranked by their similarities to their k-th NN, where k is a predetermined number. Calls with similarities smaller than a predetermined threshold may be discarded. Similarity between two voiceprints may be defined as cosine similarity or log-likelihood ratio in probabilistic linear discriminant analysis (PLDA).

At step 220, the clustering servers 115 may cluster the plurality of voiceprints. Each individual call may start in its own cluster. With each iteration of the clustering service, calls may be clustered together based on voiceprint similarity. Thus, each resulting cluster contains calls from the same person/voice (in the most common case). If calls in a cluster are associated with multiple (credit card, bank, etc.) accounts (that belong to multiple people), it is likely that the person is a fraudster (for example, a person trying to take over multiple accounts). The clustering service may perform, for example, agglomerative hierarchical clustering (AHC) on the voiceprints. Other techniques may perform AHC to distinguish callers (speaker diarization) within call recordings/streams. Techniques presented herein may apply AHC across a plurality of recordings to determine which calls/recordings originated from which person/voice. Other clustering algorithms such as K-means may optionally be used, either alternatively or in tandem with AHC. In the AHC algorithm, a similarity between clusters is determined by a linkage criterion. Examples include complete linkage (defined as the minimum similarity between all pairs of voiceprints across two clusters) and average linkage (defined as the average similarity between all pairs of voiceprints across two clusters). The minimum similarity or the average similarity between pairs of voiceprints between two clusters may be used to determine whether to automatically merge the two clusters (i.e. assert that the two clusters contain calls from the same person/voice). Other metrics such as maximum or median similarity may also be used to determine whether clusters should be merged.

Additionally, metadata associated with the calls may be concatenated with the voiceprints to provide supplemental information. Metadata may include simple call attributes such as call duration and/or servicing queue. It may also include attributes of the transcript of the call (which may be obtained for example, from an automatic speech recognition system). As an example, 100 relevant words may be selected, and then the number of times those words were spoken in the calls may be counted. For each call, a 100-dimensional vector may thus be determined that encodes the word counts. This 100-dimensional vector may be concatenated with the voiceprint, so that the combined vector not only captures the acoustic information, but also the actual content of the call. As another example, if calls A and B are equally similar in terms of voiceprints to a particular blacklisted cluster, but call A's phone number is frequently used in that cluster while call B's is not, then it may be determined that call A is higher risk (more likely to be fraudulent) than call B.

A predetermined similarity threshold may be used as the stopping criterion for the clustering algorithm. The clustering algorithm may be executed until the stopping criterion is reached. The stopping criterion may implement a tradeoff between possibly lumping together too many calls, including those of differing speakers, and possibly lumping together not enough calls, including some that are associated with the same speaker. Once there are no additional clusters with similarities above a threshold, the stopping criteria is reached and no additional clusters are merged.

Certain clusters in the plurality of voiceprints may be spurious. For example, some clusters may contain more than one voice. Another example of a spurious cluster is when a cluster contains all the calls that share a common hold music or background interference. Even though the caller voices are different, these calls may get clustered together because the voiceprints contain the common information of the same hold music/background interference. Another spurious situation might be a cluster with only one voice, but where the call pattern is benevolent. For example, this might occur if a single caller calls a company about the same account or service multiple times. To locate spurious clusters, at step 225, the clusters may be filtered based on one or more criteria which may include:

Cluster size

Cluster coherence (e.g., the scatter of voiceprints within the cluster)

Metadata of cluster members

The distribution of similarity scores between the cluster and a set of voiceprints (e.g., the voiceprints ingested in step 210)

The proportion of calls that are confirmed to be associated with suspicious activity For example, a minimum cluster size, e.g., around 10, may be determined. The minimum cluster size may be set based on the number of voiceprints being clustered. Cluster coherence (or cluster scatter) may be measured by, as an example, the standard deviation of predetermined dimensions of the voiceprints within the cluster. If the scatter is greater than a predetermined threshold then we may discard that cluster.

The metadata may include one or more customer account identifiers associated with the calls within a cluster. If, for example, a cluster only contains calls associated with a single account ID, it may be determined that the cluster corresponds to a legitimate customer who just calls frequently. Hence this cluster may be discarded.

Once the clusters are determined, at step 230 the resulting clusters ("blacklist entries") may be stored in a database or other data store, for example at blacklist matching servers 120.

The set of clusters may act as a blacklist. Future calls recorded or streamed may be compared with the existing clusters. Fraudulent or other undesirable callers may call repeatedly using multiple voice service accounts. In this manner, the voices of known fraudulent callers may quickly and automatically be identified. When a call is received, at step 235, the new call voiceprint is compared with the existing clusters. This comparison may be performed at the blacklist matching servers 120 and/or voiceprint servers 105, for example. If there are 100 existing clusters, the new call may receive 100 scores, each representing a similarity to each existing cluster. If the call fits into an existing cluster greater than a predetermined degree of similarity (e.g., the score is equal to or exceeds a predetermined threshold), the call may be added to the cluster, and the associated voice may be considered a candidate for blacklisting. The call may be manually and/or automatically reviewed, at step 240, to assess if they are true or false positives. For example, a human may listen to the new call and calls from the associated cluster to verify the match. Alternatively, if the similarity between the new voiceprint and the cluster is above a first lower threshold, a human may listen to the call to verify. However, if the similarity is above a second higher threshold, the call may automatically be blacklisted. Human reviewers might review only the highest-scoring cluster for comparison with the new call, or might review all clusters for comparison with the new call with similarity scores above a predetermined threshold.

The genuine owner of an account also may give permission to the company or other organization to store their own genuine voiceprint for comparison in the event that a caller makes a request related to their account. The owner also may give permission for multiple persons to provide a voiceprint for some or all levels of account access, effectively forming a whitelist associated with the account. As such, a fraudulent caller might not match with any known fraudulent caller in the clusters, but may still be denied access due to lacking a voiceprint that matches with the voiceprint of the genuine account holder. Anti-fraud actions discussed herein also may be taken against a caller or voice account lacking whitelist verification, even if that caller does not match with a blacklisted cluster.

At step 245, actions may then be taken to stop the fraudulent activity. If the caller is calling into an organization such as a company and/or service, the organization may decline the request of the fraudulent caller. The organization may further flag the voice service account (e.g., phone number), and decline all requests from the voice service account in the future. The organization may further determine a genuine account holder associated with the request from the fraudulent caller. The organization may warn, such as with an alert, the genuine account holder of the suspicious activity, require new account logins or credentials, require a new credit card be issued, etc. The account in question may be flagged and temporarily or permanently restricted. If the caller is flagged while the call is still ongoing, additional security questions may be required before a request is granted. The organization also may share the voiceprint of the caller of the fraudulent or other undesirable call with other companies or other organizations.

The organization may further determine a non-fraudulent, non-harassing, or otherwise not undesirable voice service account associated with the voice of the fraudulent caller. This account may be the genuine account for the fraudulent caller, indicating that a name or address associated with this genuine account may be the genuine identity of the fraudulent caller. This information may be used to restrict usage of the fraudulent caller's accounts, and may be reported to other organizations and/or law enforcement.

At step 250, the clusters in the blacklist may be reviewed either automatically or manually for effectiveness. For example, blacklist entries that have a high rate of false positives may be removed to enhance the quality of the blacklist. Characteristics of the invalid blacklist entries may be used to further fine tune system parameters (e.g., criteria to filter out spurious clusters). For example, if it is determined that the invalid clusters are all small in cluster size (i.e., number of calls in the cluster is below a predetermined threshold), we may consider increasing the threshold for cluster size discussed above in step 225. In general, if it is determined that the invalid clusters tend to associate with a specific kind of call metadata (e.g., call servicing queue and call duration), corresponding constraints may be introduced in step 225 above (e.g., not consider clusters that only contains calls from a specific queue).

Figure 3:
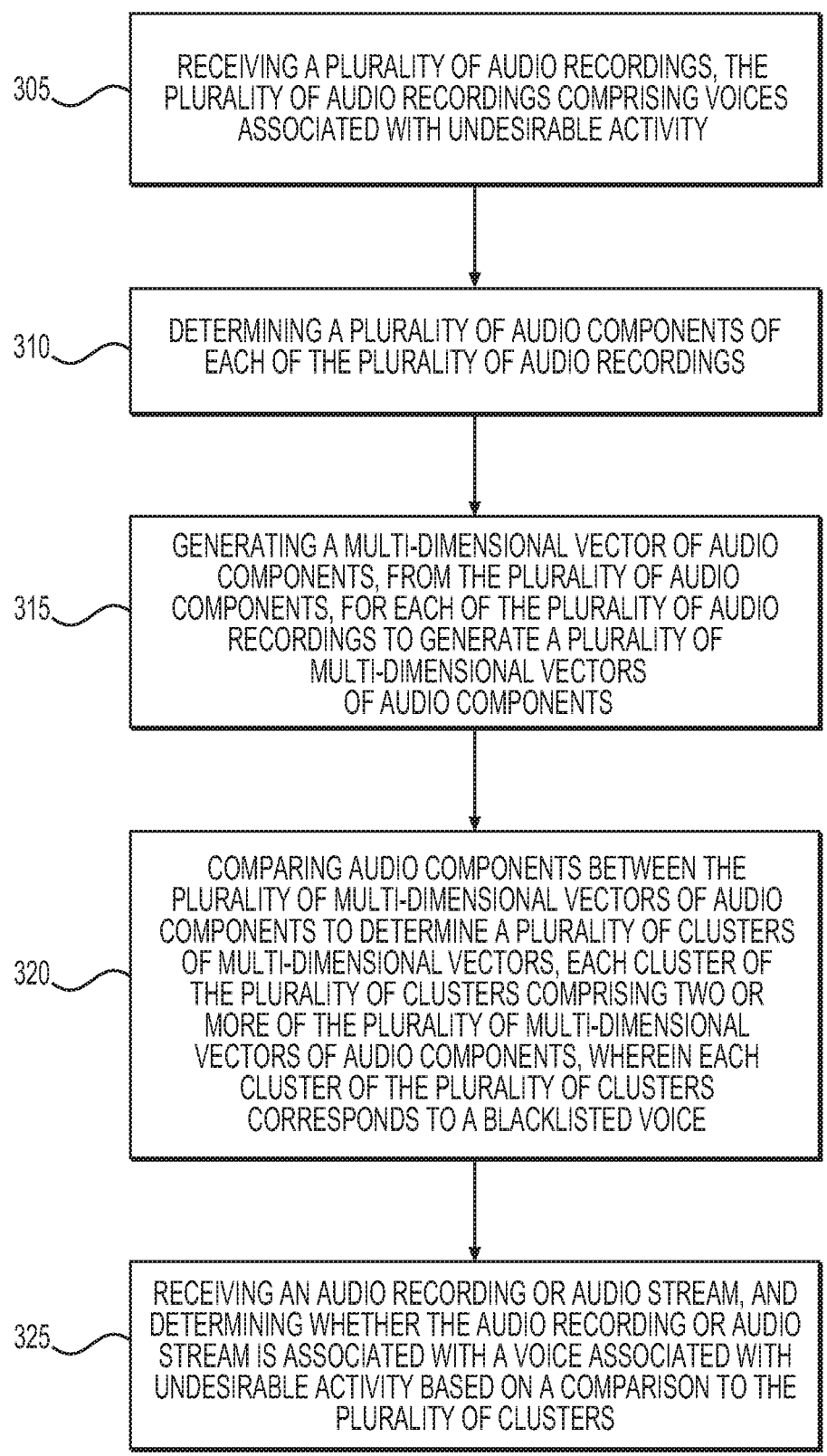
FIG. 3 illustrates a process for clustering potentially fraudulent or otherwise undesirable voices, according to one or more embodiments.

FIG. 3 illustrates an example process for determining potentially undesirable voices, according to techniques presented herein. A plurality of audio recordings may be received at step 305, the plurality of audio recordings comprising voices that might or might not be associated with undesirable activity. At step 310, a plurality of audio components of each of the plurality of audio recordings may be determined. A multi-dimensional vector of audio components may be generated at step 315, from the plurality of audio components, for each of the plurality of audio recordings to generate a plurality of multi-dimensional vectors of audio components. At step 320, audio components between the plurality of multi-dimensional vectors of audio components may be compared to determine a plurality of clusters of multi-dimensional vectors, each cluster of the plurality of clusters comprising two or more of the plurality of multi-dimensional vectors of audio components, wherein each cluster of the plurality of clusters corresponds to a blacklisted voice. At step 325, audio recording or audio stream may be received, and it may be determined whether the audio recording or audio stream is associated with a voice associated with undesirable activity based on a comparison to the plurality of clusters.

Figure 4:
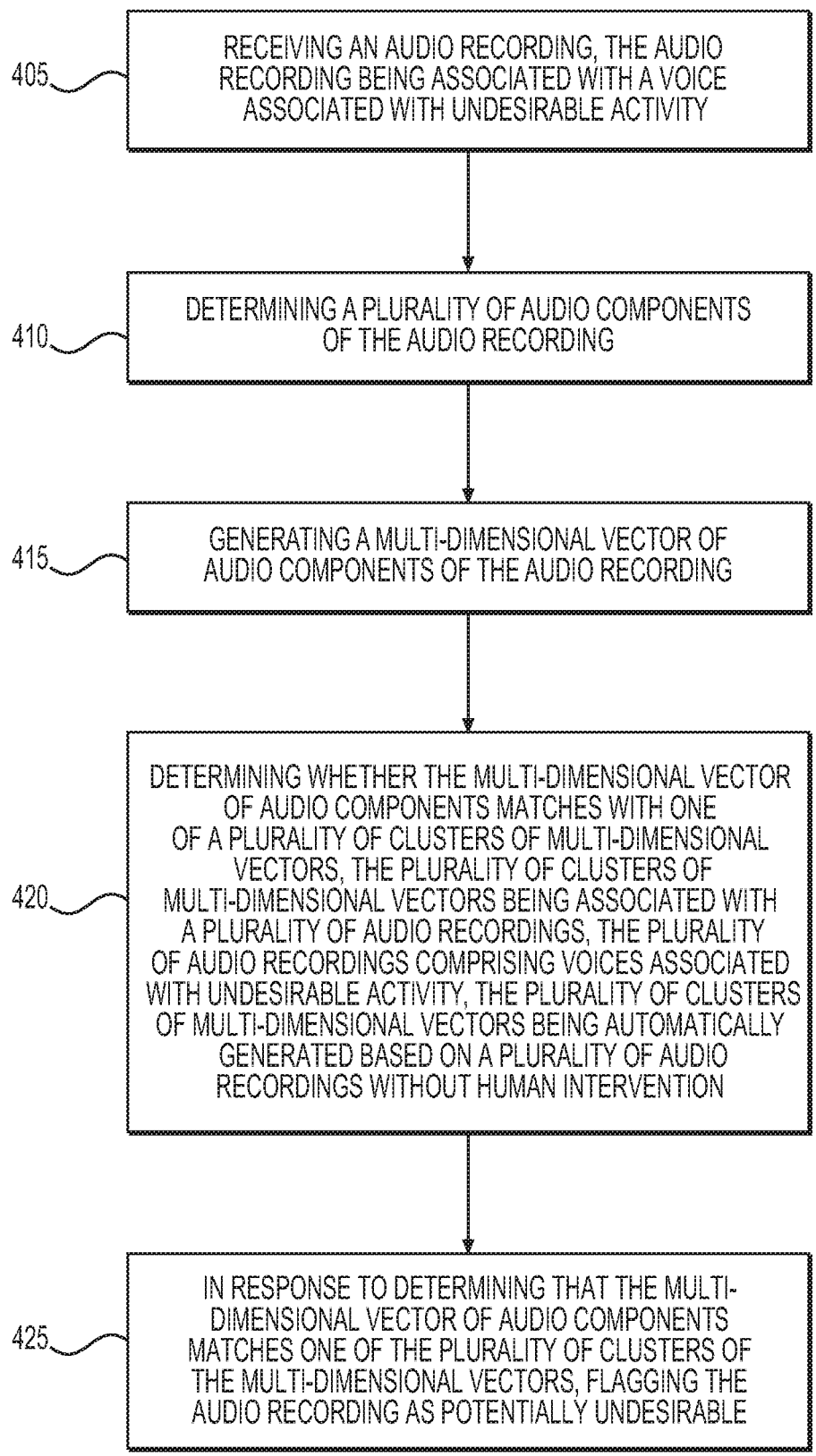
FIG. 4 illustrates a process for determining potentially fraudulent or undesirable voices, according to one or more embodiments.

FIG. 4 illustrates a process for determining potentially undesirable voices, according to one or more embodiments presented herein. At step 405, an audio recording may be received, the audio recording being associated with a voice associated with undesirable activity. A plurality of audio components of the audio recording may be determined at step 410. At step 415, a multi-dimensional vector of audio components of the audio recording may be generated. At step 420, it may be determined whether the multi-dimensional vector of audio components matches with one of a plurality of clusters of multi-dimensional vectors, the plurality of clusters of multi-dimensional vectors being associated with a plurality of audio recordings, the plurality of audio recordings being associated with a plurality of undesirable voices, the plurality of audio recordings comprising voices associated with undesirable activity, the plurality of clusters of multi-dimensional vectors being automatically generated based on a plurality of audio recordings without human intervention. In response to determining that the multi-dimensional vector of audio components matches with one of the plurality of clusters of the multi-dimensional vectors, at step 425 the audio recording may be flagged as potentially undesirable.

Figure 5:
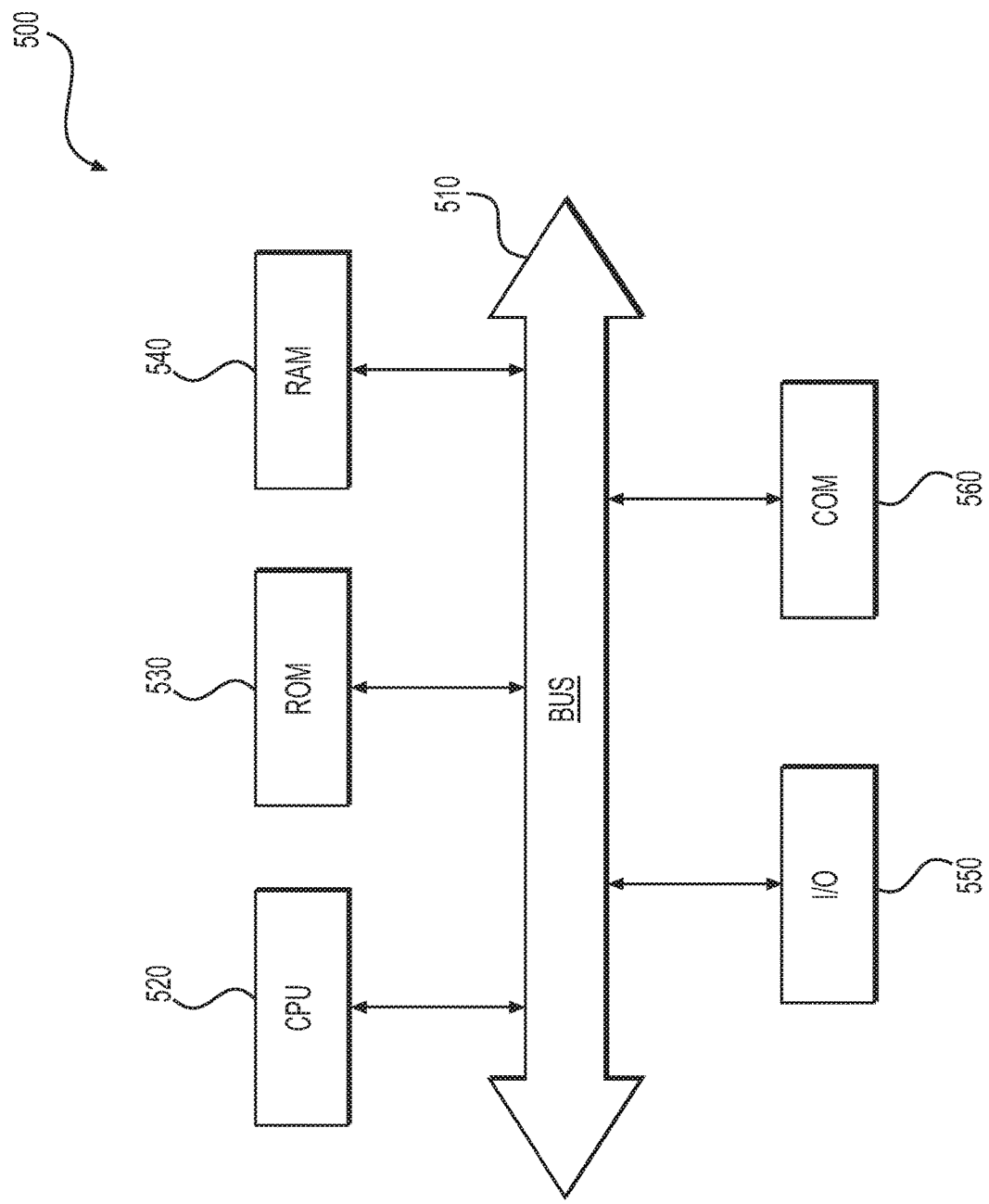
FIG. 5 is a simplified functional block diagram of a computer that may be configured as a device for executing the methods of FIGS. 2-4, according to exemplary embodiments of the present disclosure.

FIG. 5 is a simplified functional block diagram of a computer 500 that may be configured as a device for executing the methods of FIGS. 2-4, according to exemplary embodiments of the present disclosure. FIG. 5 is a simplified functional block diagram of a computer that may be configured as the voiceprint servers 105, blacklist matching servers 120, and/or clustering servers 115, content delivery network (CDN), platforms, and/or exchanges for executing the methods presented herein, according to exemplary embodiments of the present disclosure. Specifically, in one embodiment, any of the user devices, servers, discussed herein may be an assembly of hardware 500 including, for example, a data communication interface 560 for packet data communication. The platform also may include a central processing unit ("CPU") 520, in the form of one or more processors, for executing program instructions. The platform may include an internal communication bus 510, program storage, and data storage for various data files to be processed and/or communicated by the platform, such as read-only memory (ROM) 530 and random access memory (RAM) 540, although the system 500 may receive programming and data via network communications. The system 500 also may include input and output ports 550 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes shown in FIGS. 2-4; and processes involving operations of the voiceprint servers 105, clustering servers 115, and/or blacklist matching servers 120. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for determining voices associated with undesirable activity, comprising:
   receiving a plurality of audio recordings, the plurality of audio recordings comprising voices associated with undesirable activity;
   determining a plurality of audio components of each of the plurality of audio recordings;

generating a multi-dimensional vector of audio components, from the plurality of audio components, for each of the plurality of audio recordings to generate a plurality of multi-dimensional vectors of audio components;

comparing audio components between the plurality of multi-dimensional vectors of audio components to determine a plurality of clusters of multi-dimensional vectors, each cluster of the plurality of clusters comprising two or more of the plurality of multi-dimensional vectors of audio components, wherein each cluster of the plurality of clusters corresponds to a blacklisted voice;

determining at least one erroneous cluster in the plurality of clusters by filtering the plurality of clusters, according to one or more predetermined thresholds, based on at least one of: cluster size, cluster coherence, cluster member metadata, a distribution of similarity scores, or a proportion of audio recordings associated with each of the plurality of clusters confirmed to be associated with undesirable activity;

removing the erroneous cluster from the plurality of clusters;

receiving an audio recording or audio stream; and determining whether the audio recording or audio stream is associated with a voice associated with undesirable activity based on a comparison to the plurality of clusters.

2. The method of claim 1, further comprising:

performing a nearest neighbor search on each of the plurality of multi-dimensional vectors of audio components to determine a nearest neighbor metric; and discarding one or more of the plurality of audio recordings in response to determining that the one or more of the plurality of audio recordings has a nearest neighbor metric smaller than a predetermined nearest neighbor metric.

3. The method of claim 2, wherein comparing audio components between the plurality of multi-dimensional vectors of audio components comprises determining a minimum similarity between each of the plurality of multi-dimensional vectors of audio components and/or determining an average similarity between each of the plurality of multi-dimensional vectors of audio components.

4. The method of claim 1, wherein determining whether an audio recording or audio stream is associated with a voice associated with undesirable activity comprises:

receiving an audio recording, the audio recording comprising a voice;

determining a plurality of audio components of the audio recording;

generating a multi-dimensional vector of audio components of the audio recording;

determining whether the multi-dimensional vector of audio components matches with one of the plurality of clusters of multi-dimensional vectors; and in response to determining that the multi-dimensional vector of audio components clusters with one of the plurality of clusters of the multi-dimensional vectors, flagging the audio recording as being associated with a voice associated with undesirable activity.

5. The method of claim 1, wherein the plurality of clusters of multi-dimensional vectors is determined without human assistance.

6. The method of claim 1, wherein each multi-dimensional vector of audio components of the plurality of multi-dimensional vectors of audio components comprises a fixed number of dimensions.

7. The method of claim 1, wherein comparing audio components between the plurality of multi-dimensional vectors of audio components further comprises performing agglomerative hierarchical clustering across the plurality of audio recordings.

8. The method of claim 1, further comprising:

upon determining that the audio recording or audio stream is associated with a voice associated with undesirable activity, determining a genuine account based on the audio recording or audio stream;

determining the verified owner of the genuine account; and generating an alert to the verified owner of the genuine account.

9. The method of claim 1, wherein comparing audio components between the plurality of multi-dimensional vectors of audio components further comprises concatenating metadata, associated with the plurality of audio recordings, with the plurality of the plurality of multi-dimensional vectors.

10. The method of claim 1, wherein the comparison to the plurality of clusters comprises determining a cosine similarity or log-likelihood ratio.

11. The method of claim 1, further comprising:

storing the plurality of clusters of multi-dimensional vectors in an undesirable voice data store.

12. A computer-implemented method for determining voices associated with undesirable activity, comprising:

receiving an audio recording, the audio recording being associated with a voice associated with undesirable activity;

determining a plurality of audio components of the audio recording;

generating a multi-dimensional vector of audio components of the audio recording;

determining whether the multi-dimensional vector of audio components matches with one of a plurality of clusters of multi-dimensional vectors, the plurality of clusters of multi-dimensional vectors being associated with a plurality of audio recordings, the plurality of audio recordings comprising voices associated with undesirable activity, the plurality of clusters of multi-dimensional vectors being automatically generated based on a plurality of audio recordings without human intervention;

determining at least one erroneous cluster in the plurality of clusters of multi-dimensional vectors by filtering the plurality of clusters of multi-dimensional vectors, according to one or more predetermined thresholds, based on at least one of: cluster size, cluster coherence, cluster member metadata, a distribution of similarity scores, or a proportion of audio recordings associated with each of the plurality of clusters of multi-dimensional vectors confirmed to be associated with undesirable activity;

removing the erroneous cluster from the plurality of clusters of multi-dimensional vectors; and in response to determining that the multi-dimensional vector of audio components matches one of the plurality of clusters of the multi-dimensional vectors, flagging the audio recording as potentially undesirable.

13. The method of claim 12, wherein determining that the multi-dimensional vector of audio components matches one of the plurality of clusters comprises determining a cosine similarity or log-likelihood ratio.

14. The method of claim 12, wherein each of the plurality of audio recordings contains a single distinct voice.

15. The method of claim 12, wherein the multi-dimensional vector of audio components comprises a fixed number of dimensions.

16. The method of claim 12, wherein determining whether the multi-dimensional vector of audio components matches with one of a plurality of clusters of multi-dimensional vectors is determined without human assistance.

17. The method of claim 12, further comprising:
upon determining that the audio recording or audio stream is associated with a potentially undesirable voice, determining a genuine account based on the audio recording or audio stream;
determining the verified owner of the genuine account; and
generating an alert to the verified owner of the genuine account.

18. The method of claim 12, wherein the multi-dimensional vector of audio components is stored in a voice data store.

19. A computer system for determining potentially undesirable voices, the computer system comprising:
a memory storing instructions; and
one or more processors configured to execute the instructions to perform operations including:
receiving a plurality of audio recordings, the plurality of audio recordings comprising voices associated with undesirable activity;
determining a plurality of audio components of each of the plurality of audio recordings;
generating a multi-dimensional vector of audio components, from the plurality of audio components, for each of the plurality of audio recordings to generate a plurality of multi-dimensional vectors of audio components;
comparing audio components between the plurality of multi-dimensional vectors of audio components to determine a plurality of clusters of multi-dimensional vectors, each cluster of the plurality of clusters comprising two or more of the plurality of multi-dimensional vectors of audio components, wherein each cluster of the plurality of clusters corresponds to a blacklisted voice;
determining at least one erroneous cluster in the plurality of clusters by filtering the plurality of clusters, according to one or more predetermined thresholds, based on at least one of: cluster size, cluster coherence, cluster member metadata, a distribution of similarity scores, or a proportion of audio recordings associated with each of the plurality of clusters confirmed to be associated with undesirable activity;
removing the erroneous cluster from the plurality of clusters;
receiving an audio recording or audio stream; and
determining whether the audio recording or audio stream is associated with a voice associated with undesirable activity based on a comparison to the plurality of clusters.

* * * * *